US006982812B2

(12) United States Patent
Johnson

(10) Patent No.: US 6,982,812 B2
(45) Date of Patent: Jan. 3, 2006

(54) CALIBRATION OF PRINTING DEVICES

(75) Inventor: David A. Johnson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 876 days.

(21) Appl. No.: 09/767,613

(22) Filed: Jan. 22, 2001

(65) Prior Publication Data

US 2002/0134130 A1    Sep. 26, 2002

(51) Int. Cl.
*H04N 1/00* (2006.01)
*H04N 1/46* (2006.01)

(52) U.S. Cl. .................... 358/1.9; 358/406; 358/504
(58) Field of Classification Search ................ 358/406, 358/504, 1.9
See application file for complete search history.

(56) References Cited

U.S. PATENT DOCUMENTS

| | | | |
|---|---|---|---|
| 3,995,958 A | 12/1976 | Pfahl et al. | |
| 4,286,868 A | 9/1981 | Laska | |
| 5,068,810 A | 11/1991 | Ott | |
| 5,272,518 A | 12/1993 | Vincent | |
| 5,416,613 A | 5/1995 | Rolleston et al. | |
| 5,483,360 A | 1/1996 | Rolleston et al. | |
| 5,649,073 A * | 7/1997 | Knox et al. | 358/1.9 |
| 5,739,927 A | 4/1998 | Balasubramanian et al. | |
| 5,760,913 A | 6/1998 | Falk | |
| 5,818,960 A | 10/1998 | Gregory, Jr. et al. | |
| 5,956,469 A | 9/1999 | Liu et al. | |
| 6,297,873 B1 * | 10/2001 | Furuya | 355/40 |
| 6,435,654 B1 * | 8/2002 | Wang et al. | 347/43 |
| 6,804,025 B1 * | 10/2004 | Ueda et al. | 358/1.9 |

* cited by examiner

*Primary Examiner*—Twyler Lamb
*Assistant Examiner*—Chan S. Park

(57) ABSTRACT

A printing device is calibrated. An on-media calibration is performed. During on-media calibration, colorant is placed on print media. A measurement is performed to obtain on-media calibration measured values. The on-media calibration measured values are used to calibrate the printing device. An off-media calibration is performed to obtain off-media calibration measured values, Off-media calibration means skit calibration is performed without placing colorant on print media. A correlation is made between the on-media calibration measured values and the off-media calibration measured values. Subsequent off-media calibrations are performed in which the off media calibration measured values are used along with the correlation between the on-media calibration measured values and the off-media calibration measured values to calibrate the printing device.

20 Claims, 5 Drawing Sheets

CALIBRATION OF PRINTING DEVICES

BACKGROUND

The present invention concerns calibration of printers and other devices that perform printing and pertains particularly to improved calibration of printing devices.

During the course of operation of a printer, the print parameters which control printing density and shades can drift. It is desirable therefore to perform calibrations to restore print parameters to a desired state.

Calibration can be performed by printing a test pattern on print media. A densitometer or other device is used to sense the amount of toner present on the media. The data from the densitometer can then be used to set printing parameters.

The on-media calibration described above can be used to very accurately set print parameters. However, there are costs associated with the accuracy. Particularly, each calibration cycle consumes media. The calibration cycle is disruptive to customer print jobs, and can reasonably only be done between print jobs. Because of these costs (time, money, materials, user involvement), it is impractical to perform on-media calibration automatically or often. This limits the practicality of on-media calibration to systems that are inherently stable, and where significant process drift occurs only over long periods of time or printing.

One alternative to on-media calibration is off-media calibration. In off-media calibration, calibration is performed by printing a test pattern, not on media usually used for printing, but on a transport belt or some other permanent entity within the printer. In this case, a densitometer or some other device is used to sense the amount of toner present. The data from the densitometer can then be used to set printing parameters.

Off media calibration has the advantage of not consuming media. Off-media calibration can also be performed automatically, with little impact on users. However, off-media calibration is prone to inaccuracy since the measurement is made in a substitute fashion (e.g. printing on the transport belt) or at some intermediate stage in the printing process. It is necessary, therefore, in order to adjust print parameters during off-media calibration, to rely on correlations made at the factory to determine how density values detected during off-media calibration relates to printing density present when printing is actually performed on-media. A user of the printer may be able to adjust correlation values set at the factory; however, this typically requires that a test page is printed and viewed by the user. The user then makes some judgements judgments and enters adjustment information back into the printer. Several iterations may be required before a user is content with the adjustments made to the correlation values. The adjustment factors provided in any such calibration method must also be predetermined in the factory, and may not be sufficient to compensate for actual variations.

SUMMARY OF THE INVENTION

In accordance with the preferred embodiments of the present invention, a printing device is calibrated. An on-media calibration is performed. During on-media calibration, colorant is placed on print media. A measurement is performed to obtain on-media calibration measured values. The on-media calibration measured values are used to calibrate the printing device. An off-media calibration is performed to obtain off-media calibration measured values. Off-media calibration means calibration is performed without placing colorant on print media. A correlation is made between the on-media calibration measured values and the off-media calibration measured values. Subsequent off-media calibrations are performed in which the off-media calibration measured values are used along with the correlation between the on-media calibration measured values and the off-media calibration measured values to calibrate the printing device.

For example, depending on the type of printer, the colorant is toner or some other form of ink. Colorant is placed on the print media, for example, in half-toned patches.

The measurements for on-media calibration are performed, for example, using a densitometer, a calorimeter, a spectrophotometer, or some other device capable of detecting variations in shade or density of colorant. Print parameters of the printing device are varied until the on-media calibration measured values are substantially equal to target measure values.

Off-media calibration is performed, for example, by placing colorant on a transportation belt of the printing device. A measurement of the colorant on the transportation belt is performed to obtain the off-media calibration measured values. The measurements for off-media calibration can be performed by the same sensor used for the on-media calibration. Alternatively, the measurements for off-media calibration can be performed using a different sensor or even using a different methodology.

For example, off-media calibration can be performed using drop mass measurements for inkjet print systems (directly measured or inferred from other characteristics). Off-media calibration can also be performed using toner charge characteristics for electro-photographic (EP) print systems. Off-media calibration can also be performed using characteristics of transfer mechanisms for EP print systems, such as charge properties of developers or transport mechanisms. Off-media calibration can also be performed using doner sheet transmission rates for thermal transfer print systems. Off-media calibration can also be performed using environmental measurements (such as humidity and temperature) in regions of importance to the printing process.

By carefully combining on-media calibration and off-media calibration, the present invention retains the best of both calibration methodologies. The on-media calibration establishes an accurate correlation, and the off-media calibration compensates for subsequent drift. Since the customer impact of off-media measurements is very small (potentially non-existent), the off-media measurements can be done frequently, allowing for near-continuous detection and correction of errors. This provides higher accuracy, no need for user judgement or manual adjustment, and minimal media wastage.

The foregoing discussion summarizes merely exemplary methods and embodiments of the present invention which are discussed in more detail below. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

DESCRIPTION OF THE PREFERRED EMBODIMENT

Figure 1:
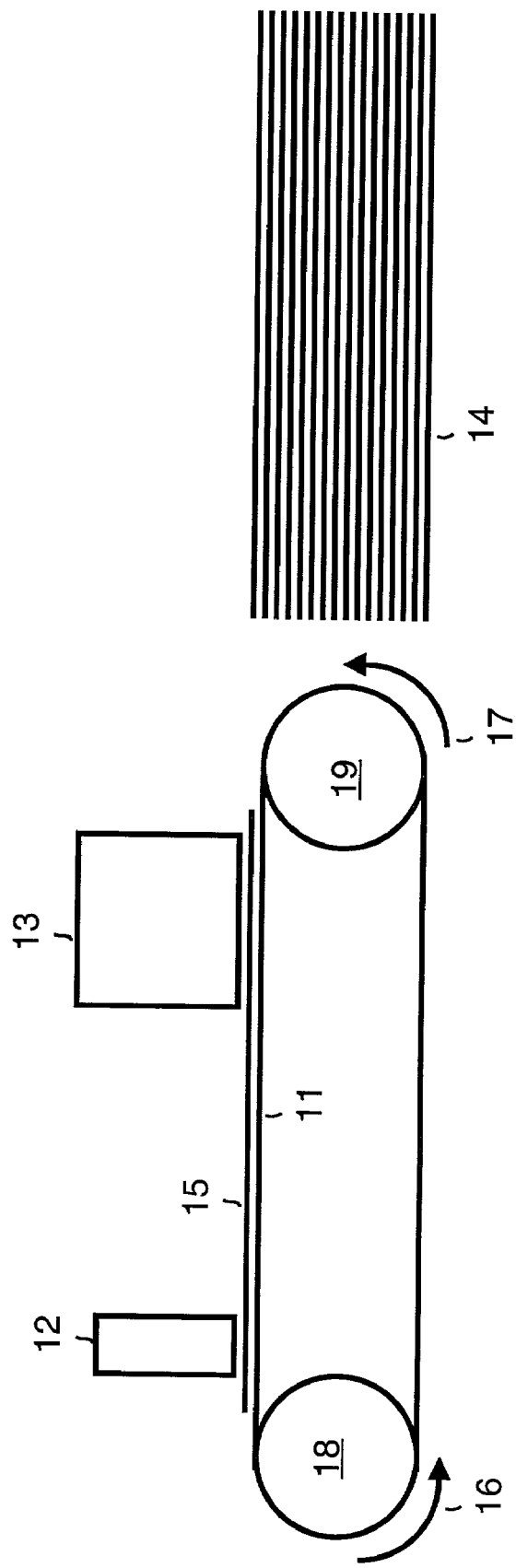
FIG. 1 and FIG. 2 are simplified block diagrams that illustrate an on-media calibration cycle performed in accordance with a preferred embodiment of the present invention.
Figure 2:
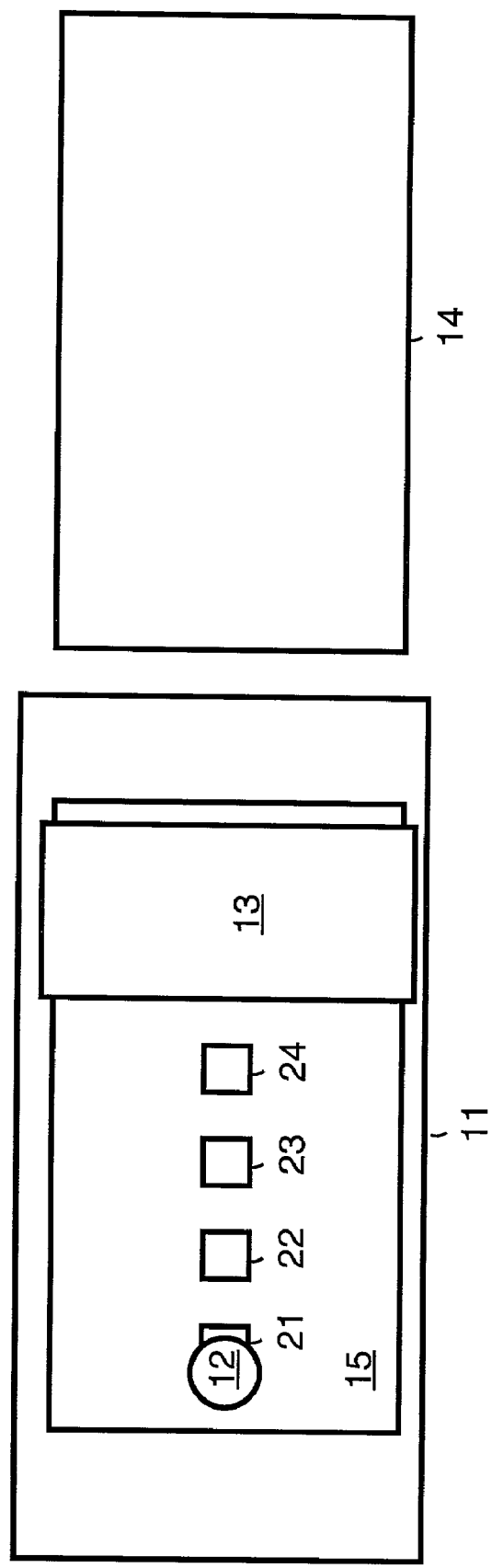

FIG. 1 and FIG. 2 are simplified block diagrams that illustrate performance of an on-media calibration cycle. In the preferred embodiment of the present invention, an on-media calibration is performed to set the print parameters to the desired state. An off-media calibration is performed immediately before or after the on-media calibration to establish a correlation between on-media and off-media calibrations. Subsequently, off-media calibrations are performed to measure and compensate for drifts in the process. Periodically, another on-media calibration is done to reset the target, and establish a new correlation to off-media calibration. other device measuring the properties of test patches.

As shown in FIG. 1, a sensor 12 is located adjacent to a transportation belt 11 where sensor 12 can sense the amount of colorant (e.g., toner or ink) present on either the transportation belt 11 or actual media 14. Sensor 12 is, for example, a densitometer, a colorimeter, or a spectrophotometer, or any other device measuring the properties of test patches.

Transportation belt 11 is moved by rotating portion 18 rotating in a direction represented by arrow 16, and by rotating portion 19 rotating in a direction represented by arrow 17.

Figure 3:
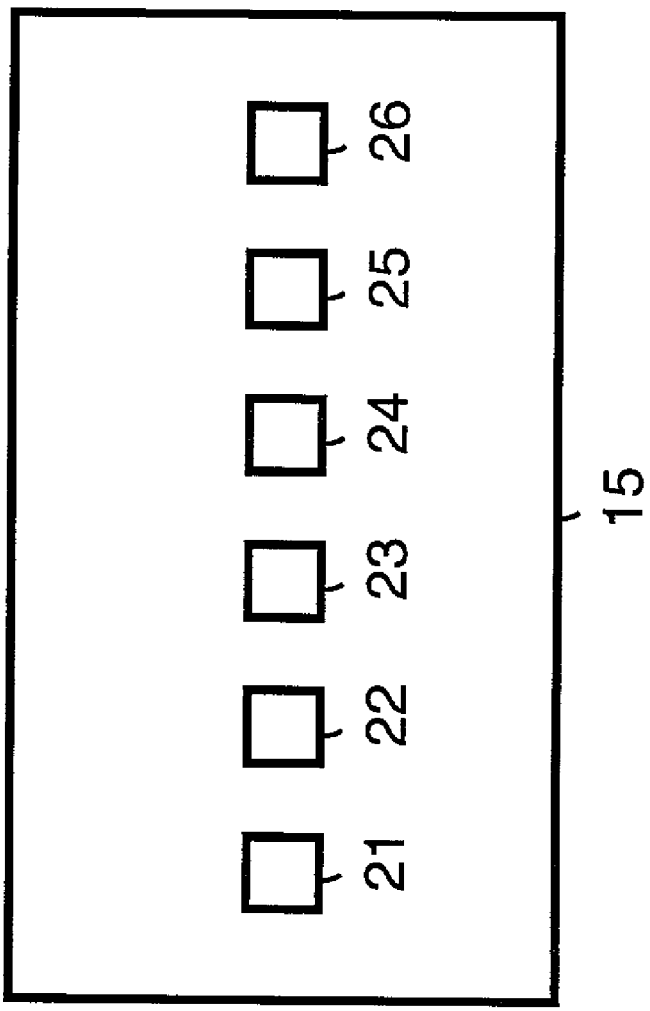
FIG. 3 is a simplified diagram that shows a test pattern used in marking engine calibration in accordance with a preferred embodiment of the present invention.

When performing on-media calibration, a marking system 13 prints a series of half-toned patches on a normal media sheet 15. The half-toned patches are represented by a patch 21, a patch 22, a patch 23 and a patch 24 shown in FIG. 2, and by a patch 25 and a patch 26 shown in FIG. 3. For example, the series of patches sample density values from light to dark. For example, there is a series of patches for each colorant utilized in the printer system. The patches used during calibration can, for example, include more than one halftone pattern. The patches can be contoned areas as well. Also, the patches can be a mixture of colorants.

The half-toned patches placed on media sheet 15 pass near sensor 12. Sensor 12 measures the densities and thereby calculates the actual amount of colorant (e.g., toner or ink) present for each patch. The measured values for the patches on media sheet 12 are compared to previously defined target values, and the errors are used to calculate how to adjust the engine printing parameters to compensate for these errors. Alternatively, the measurement data can be used to alter the data that composes the image being printed, rather than to adjust the operating parameters of the printer.

The cycle of print, measure, compare, adjust may be repeated multiple times to achieve desired accuracy. When desired accuracy is obtained, on-media calibration is completed.

Figure 4:
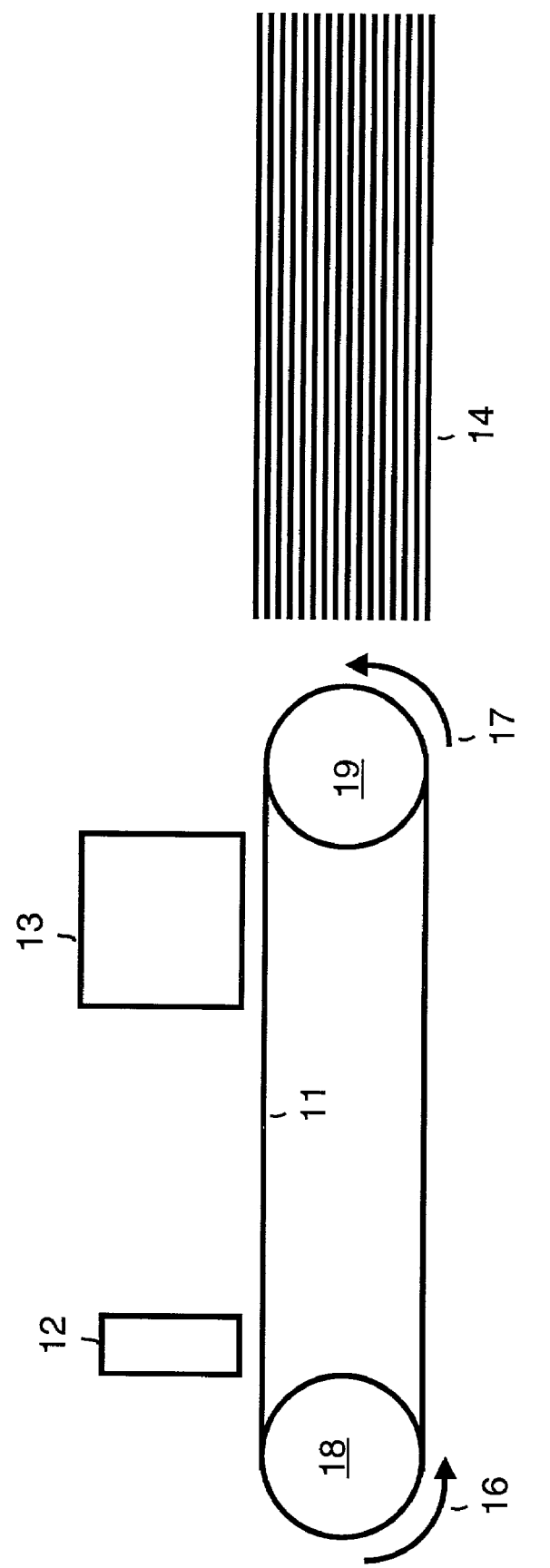
FIG. 4 and FIG. 5 are simplified block diagrams that illustrate an off-media calibration cycle performed in accordance with a preferred embodiment of the present invention.
Figure 5:
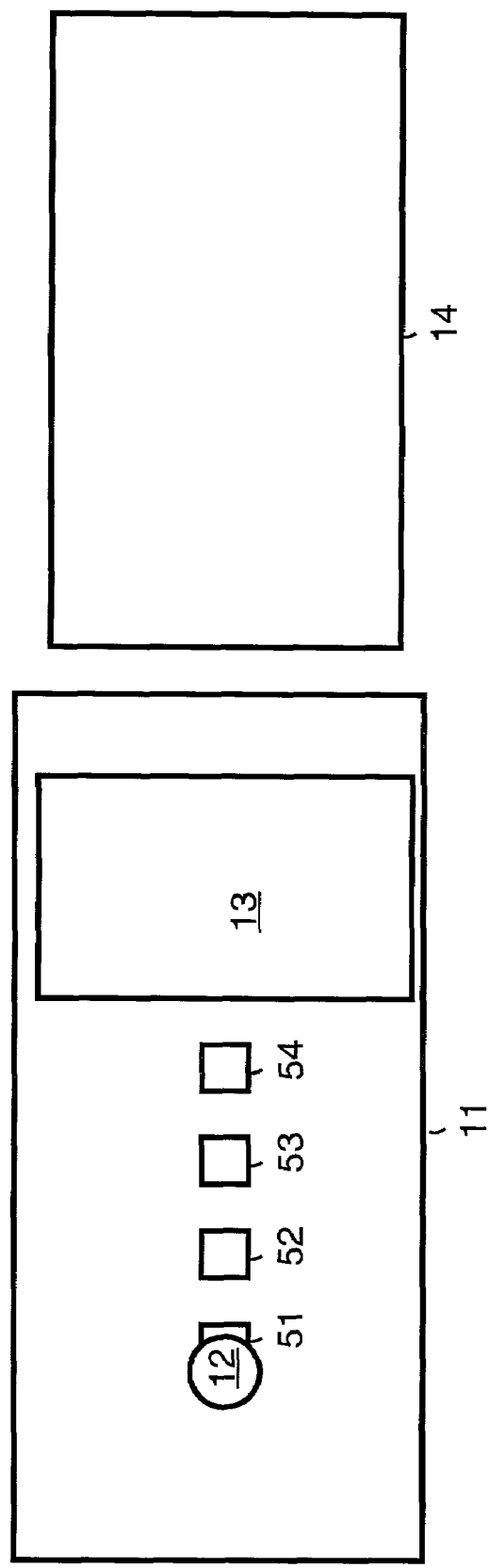

Immediately following on-media calibration is performed where patches are printed on transportation belt 11 rather than on media sheets 14. This is illustrated by FIG. 4 and FIG. 5. Patches, represented in FIG. 5 by a patch 51, a patch 52, a patch 53 and a patch 54 printed on transportation belt 11, are printed with identical amounts of toner or toner as are the patches represented by patches 21 through 26 (shown in FIG. 3) printed on-media sheet 15. Sensor 12 is used to measure the densities of the patches placed on transportation belt 11. After completion of off-media calibration, results of the two calibration methods (on-media calibration and off-media calibration) are compared. A current correlation is calculated between on-media calibration and off-media calibration.

Alternatively, off-media calibration can be performed by measuring other process step (or steps) involved with the printing process, which could reasonably be correlated to on-media printing behavior. For example, off-media calibration can be performed using drop mass measurements for inkjet print systems (directly measured or inferred from other characteristics). Off-media calibration can also be performed using toner charge characteristics for EP print systems. Off-media calibration can also be performed using characteristics of transfer mechanisms for EP print systems, such as charge properties of developers or transport mechanisms. Off-media calibration can also be performed using doner sheet transmission rates for thermal transfer print systems. Off-media calibration can also be performed using environmental measurements (such as humidity and temperature) in regions of importance to the printing process. Off-media calibration can also be a combination of these methods.

After the testing cycles in which both on-media calibration and off-media calibration are performed, normal printing occurs. During idle times, or on a predetermined schedule during printing, the off-media calibration is repeated. Since the correlation between off-media calibration values and on-media calibration values has been established, the off-media calibration measurements can be used to adjust the printing parameters to compensate for any drift that may have occurred since the last on-media calibration cycle. The impact on the user is minimized by carefully selecting times and locations to perform the off-media calibration cycles.

Periodically, the entire calibration cycle (on-media calibration and off-media calibration) is redone to re-establish the correlation of the off-media calibration values to on-media calibration values.

For example, when new media is introduced to the printing system, the full calibration (on-media calibration and off-media calibration) is performed to take into account that different media can have different base properties (color, surface finish, etc.), and/or very different responses to the printer marking system. The full calibration would produce the desired on-media characteristics, and establish the correlation to off-media calibration measurements. In essence, the full calibration cycle (on-media calibration followed by off-media calibration) establishes an accurate correlation between on-media measured calibration values and off-media measured calibration values. The subsequent off-media calibration compensates for drift. Since the customer impact of off-media measurements is very small (potentially non-existent), the off-media calibration can be done frequently, allowing for near-continuous detection and correction of errors. This provides high accuracy, no user judgement, and minimal media wastage.

Depending on the application, the on-media calibration may use one or several sheets of media. The on-media calibration can also be done in several iterations, if necessary, to ensure accurate on-media printing. For continuous feed (roll) printers on-media calibration can consume as much media as is required to obtain satisfactory calibration.

While in the preferred embodiment discussed above, off-media calibration is performed after on-media calibrations, in various other embodiments, off-media calibration can be performed before on-media calibration, after on-media calibration or during on-media calibration, for example, in between printing on-media calibration pages. Off-media calibrations can also be done in several iterations, if necessary, to ensure accurate measurement.

For example, off-media calibration is performed intermittently during normal printing during some period of time before or after on-media calibration. Also, on-media calibration need not all be conducted as one test, but can be performed piecemeal at predetermined time intervals.

The off-media calibration need not all be conducted as one continuous test, but also can occur piecemeal. Even in continuous print streams, it is possible to fit one or more patches in the region of the transport belt between two pages. By cycling through the entire set of patches, all needed patches can be printed on the transport belt, while printing actual documents. In this approach, off-media calibration can have no impact on throughput of normal print jobs.

In the embodiment shown in FIG. 1, a single sensor (sensor 12) is shown looking at a single location on transportation belt 11. In alternative embodiments, two or more sensors can be used. For example, if two sensors are used, one sensor can look at the transportation belt and one can look at media at any point beyond where colorant (e.g., toner or ink) is deposited on the media. This can be, for example, at a point where all process steps, including fusing, have been completed.

For example, correlation between on-media calibration measurements and off-media calibration measurements is performed as follows.

In this example, nine patches in a vertical line, at equal spacing increasing in density from white to black are used for calibration. In the factory, target measure values ($T_0$, $T_1$, $T_2$, $T_3$, $T_4$, $T_5$, $T_6$, $T_7$, $T_8$) for on-media calibrated are determined.

When conducting on-media calibrations, the nine patches are printed on-media (e.g., a sheet of paper). The media is conveyed under a sensor, which produces a digital signal for each patch that corresponds to the amount of colorant sensed on the paper. The results are on-media calibration measured values ($M_0$, $M_1$, $M_2$, $M_3$, $M_4$, $M_5$, $M_6$, $M_7$, $M_8$). During on-media calibration measured values ($M_0$, $M_1$, $M_2$, $M_3$, $M_4$, $M_5$, $M_6$, $M_7$, $M_8$) are equal or approximately equal to the target measure values ($T_0$, $T_1$, $T_2$, $T_3$, $T_4$, $T_5$, $T_6$, $T_7$, $T_8$).

Once this is accomplished, the same patches are printed on the transport belt, and are measured by the same sensor, which produces another set of digital signals corresponding to the amount of colorant sensed on the paper. The result are off-media calibration measured values ($B_0$, $B_1$, $B_2$, $B_3$, $B_4$, $B_5$, $B_6$, $B_7$, $B_8$). The transportation belt is subsequently cleaned to remove the colorant (e.g., toner or ink).

For each patch, a correlation constant ($C_0$, $C_1$, $C_2$, $C_3$, $C_4$, $C_5$, $C_6$, $C_7$, $C_8$) is calculated as set out in Table 1 below:

TABLE 1

$C_0 = M_0/B_0$,
$C_1 = M_1/B_1$,
$C_2 = M_2/B_2$,
$C_3 = M_3/B_3$,
$C_4 = M_4/B_4$,
$C_5 = M_5/B_5$,
$C_6 = M_6/B_6$,
$C_7 = M_7/B_7$,
$C_8 = M_8/B_8$,

During subsequent off-media calibrations, when an on-media calibration is not performed, print parameters of the print engine are varied so that the relationships set out in Table 2 below are true.

TABLE 2

$T_0 = C_0 * B_0$,
$T_1 = C_1 * B_1$,
$T_2 = C_2 * B_2$,
$T_3 = C_3 * B_3$,
$T_4 = C_4 * B_4$,
$T_5 = C_5 * B_5$,
$T_6 = C_6 * B_6$,
$T_7 = C_7 * B_7$,
$T_8 = C_8 * B_8$,

The correlation constants ($C_0$, $C_1$, $C_2$, $C_3$, $C_4$, $C_5$, $C_6$, $C_7$, $C_8$) are used until a new on-media calibration is performed. At that point, a new set of correlation constants ($C_0$, $C_1$, $C_2$, $C_3$, $C_4$, $C_5$, $C_6$, $C_7$, $C_8$) is calculated.

In the above, example, nine patches arranged in vertical line were used for testing. As would be understood by a person of ordinary skill in the art, there could be more or less patches, which may or may not be in a vertical line. The patches need not be imaged at the same time. For example, patches could be interlaced between customer printed pages, etc. The correction algorithm used here could be varied, for example by using an offset, or replaced by any number of possible functions that correlate off-media measurement values with on-media measurement values. Also, if needed to counteract noise, latency can be introduced so that the current on-paper measurements are combined with some number of past measurements and/or with measurements from multiple sheets of media with the same or different types of patches. The patches will generally span the full range of print densities, but may be unequally spaced, and may be distributed in only certain parts of the total range of possible densities.

I claim:

1. A method for calibrating a printing device, comprising the following steps:
    (a) performing an on-media calibration, including the following substeps:
    (a.1) placing colorant on print media,
    (a.2) performing a measurement to obtain on-media calibration measured values of the colorant on the print media, and
    (a.3) using the on-media calibration measured values to calibrate the printing device;
    (b) performing an off-media calibration to obtain off-media calibration measured values of the colorant, the off-media calibration being performed without placing the colorant on print media;
    (c) making a correlation between the on-media calibration measured values of the colorant placed on the print media and the off-media calibration measured values of the colorant placed on the print media; and,
    (d) performing subsequent off-media calibrations by placing the colorant on other than the print media to obtain additional off-media calibration measured values which are used along with the correlation between the on-media calibration measured values and the off-media calibration measured values to calibrate the printing device.

2. A method as in claim 1 wherein in substep (a.1) the colorant is toner.

3. A method as in claim 1 wherein in substep (a.1) the colorant is ink.

4. A method as in claim 1 wherein in substep (a.2) the measurement is performed using at least one of a densitometer, a colorimeter, or a spectrophotometer.

5. A method as in claim 1 wherein substep (a.3) is performed by varying print parameters of the printing device until the on-media calibration measured values are substantially equal to target measure values determined during manufacture of the printing device.

6. A method as in claim 1 wherein step (b) includes the following substeps:
(b.1) placing the colorant on a transportation belt of the printing device; and,
(b.2) performing a measurement of the colorant on the transportation belt to obtain the off-media calibration measured values.

7. A method as in claim 1 wherein in substep (a.1) the colorant is placed on the print media in half-toned patches.

8. A method as in claim 7 wherein step (b) includes the following substeps:
(b.1) placing the colorant on a transportation belt of the printing device, the colorant placed on the transport belt being arranged in half-toned patches that correspond to the half-toned patches placed in substep (a.1); and,
(b.2) performing a measurement of the colorant on the transportation belt to obtain the off-media calibration measured values.

9. A self-calibrating printing device, comprising:
a printer transportation belt for transporting print media;
a marking engine configured to apply colorant on print media during on-media calibration, the marking engine further configured to apply the colorant on the printer transportation belt during off-media calibration; and,
a sensing device configured to perform a first measurement to obtain on-media calibration measured values of the colorant applied to the print media, the sensing device further configured to perform a second measurement to obtain off-media calibration measured values of the colorant applied to the printer transport belt;
wherein the self-calibrating printing device uses the on-media calibration measured values of the colorant applied to the print media to calibrate the printing device;
wherein the self-calibrating printing device makes a correlation between the on-media calibration measured values of the colorant applied to the print media and the off-media calibration measured values of the colorant applied to the printer transport belt; and,
wherein, during subsequent off-media calibrations the self-calibrating printing device uses additional off-media calibration measured values of colorant applied to the printer transport belt along with the correlation between the on-media calibration measured values and the off-media calibration measured values to calibrate the printing device.

10. A self-calibrating printing device as in claim 9 wherein the colorant is toner.

11. A self-calibrating printing device as in claim 9 wherein the colorant is ink.

12. A self-calibrating printing device as in claim 9 wherein the sensor comprises at least one of a densitometer, a colorimeter, or a spectrophotometer.

13. A self-calibrating printing device as in claim 9 wherein during the on-media calibration, the printing device varies print parameters until the on-media calibration measured values are substantially equal to target measure values.

14. A self-calibrating printing device as in claim 9 wherein during the on-media calibration, the marking engine applies the colorant to the print media in half-toned patches.

15. A self-calibrating printing device as in claim 14 wherein during the off-media calibration, the colorant applied to the transportation belt is arranged in half-toned patches that correspond to the half-toned patches applied to the print media during the on-media calibration.

16. A self-calibrating printing device as in claim 9 wherein the sensing device comprises a plurality of sensors.

17. A printing device, comprising:
a colorant placing engine configured to place colorant on print media during on-media calibration, the colorant placing engine further configured to place the colorant on other than print media during off-media calibration;
a sensing device configured to perform a first measurement to obtain on-media calibration measured values of colorant density, and further configured to perform a second measurement to obtain off-media calibration measured values of the colorant density;
wherein the printing device uses the on-media calibration measured values to calibrate the printing device;
wherein the printing device makes a correlation between the on-media calibration measured values and the off-media calibration measured values calculated daring an initial off-media calibration cycle; and,
wherein, during subsequent off-media calibration cycles, the printing device uses additional off-media calibration measured values along with the correlation between the on-media calibration measured values and the off-media calibration measured values to calibrate the printing device.

18. A printing device as in claim 17 wherein the sensor comprises at least one of a densitometer, a colorimeter, or a spectrophotometer.

19. A printing device as in claim 17 wherein during the on-media calibration, the printing device varies print parameters until the on-media calibration measured values are substantially equal to target measure values determined during manufacture of the printing device.

20. A printing device as in claim 17 wherein during the on-media calibration, the colorant placing engine places the colorant on the print media in half-toned patches.

* * * * *

UNITED STATES PATENT AND TRADEMARK OFFICE
CERTIFICATE OF CORRECTION

PATENT NO. : 6,982,812 B2  
APPLICATION NO. : 09/767613  
DATED : January 3, 2006  
INVENTOR(S) : David A. Johnson It is certified that error appears in the above-identified patent and that said Letters Patent is hereby corrected as shown below:

On the title page, item (57), under "Abstract", in column 2, line 8, delete "skit" and insert -- that --, therefor.

In column 2, line 13, delete "calorimeter" and insert -- colorimeter --, therefor.

In column 3, lines 22-23, after "calibration." delete "other device measuring the properties of test patches.".

In column 3, line 60, after "calibration" insert -- , off-media calibration --.

In column 5, line 36, delete "calibrated" and insert -- calibration --, therefor.

In column 5, line 44, after "calibration" insert -- , the parameters of the print engine are varied so that the on-media calibration --.

In column 6, line 53, in Claim 1, delete "without" and insert -- by --, therefor.

In column 6, line 54, in Claim 1, after "on" insert -- other than --.

In column 6, line 58, in Claim 1, after "on" insert -- other than --.

In column 7, line 51, in Claim 9, after "calibrations" insert -- , --.

In column 8, line 37, in Claim 17, delete "daring" and insert -- during --, therefor.

Signed and Sealed this

Fourth Day of August, 2009

JOHN DOLL  
*Acting Director of the United States Patent and Trademark Office*